US006939485B2

United States Patent
Kish

(10) Patent No.: US 6,939,485 B2
(45) Date of Patent: Sep. 6, 2005

(54) METHOD FOR SHAPING OPTICAL STORAGE DISCS AND PRODUCTS THEREOF

(76) Inventor: Randy Kish, 96 River Rock Circle S.E., Calgary, Alberta (CA), T2E 4C3

( * ) Notice: Subject to any disclaimer, the term of this patent is extended or adjusted under 35 U.S.C. 154(b) by 265 days.

(21) Appl. No.: 10/021,475

(22) Filed: Oct. 30, 2001

(65) Prior Publication Data

US 2003/0080449 A1 May 1, 2003

(51) Int. Cl.[7] ............................................. B29D 11/00
(52) U.S. Cl. ...................... 264/1.33; 264/2.7; 264/163; 425/810
(58) Field of Search ................. 264/1.33, 2.7, 264/138, 157, 163; 425/810

(56) References Cited

U.S. PATENT DOCUMENTS

| 4,599,253 | A | * | 7/1986 | Bree ......................... 428/40.9 |
| 5,108,789 | A | | 4/1992 | Michael et al. |
| 5,697,496 | A | | 12/1997 | Bauer |
| 5,882,555 | A | | 3/1999 | Rohde et al. |
| 5,938,989 | A | | 8/1999 | Hambright |
| 5,942,165 | A | | 8/1999 | Sabatini |
| 5,997,788 | A | | 12/1999 | Ebina |
| 6,078,557 | A | | 6/2000 | Pierson |
| 6,288,996 | B1 | | 9/2001 | Siegel |
| 6,437,324 | B1 | * | 8/2002 | Braun et al. ........... 250/231.14 |

FOREIGN PATENT DOCUMENTS

| JP | 59-87936 | * | 5/1984 |
| JP | 1264644 | | 10/1989 |
| JP | 05062255 | | 3/1993 |
| WO | WO 00 21080 | | 4/2000 |
| WO | WO 0032374 A | | 6/2000 |

OTHER PUBLICATIONS

International Search Report dated Jan. 30, 2003.

* cited by examiner

Primary Examiner—Mathieu D. Vargot
(74) Attorney, Agent, or Firm—Polster, Lieder, Woodruff & Lucchesi LP

(57) ABSTRACT

The invention provides a method of shaping optical storage devices (OSD) by placing an OSD between a die set having a male die and female die corresponding to a desired shape and advancing and retracting the die set so as to die-cut the OSD to the desired shape to form a shaped OSD, the shaped OSD products formed therefrom and the die set.

14 Claims, 4 Drawing Sheets

METHOD FOR SHAPING OPTICAL STORAGE DISCS AND PRODUCTS THEREOF

FIELD OF THE INVENTION

The invention provides a method of shaping optical storage discs (OSD) by placing an OSD between a die set having a male die and female die corresponding to a desired shape and advancing and retracting the die set so as to die-cut the OSD to the desired shape to form a shaped OSD, the shaped OSD products formed therefrom an the die set. The process of the invention is particularly effective in shaping recordable OSDs without damaging the data layer of the OSD adjacent the cut edge.

BACKGROUND OF THE INVENTION

In the music and computer industries, the use of optical storage media including CDs (Compact Discs) and DVDs (Digital Versatile Disc or Digital Video Disc) is well known. Read-only and read-write CDs and DVDs are presently one of the preferred means for the storage of large amounts of digital information and have considerable market acceptance. Both CDs and DVDs have different forms based on the properties of the discs, including both read-only and read-write forms. With respect to read-only CDs, these discs are referred to as CD-ROMs, read-write CDs may be referred to as CD-Rs (Compact Disc—Writeable) which include both WORM (Write Once Read Many) discs and CD-RWs (Compact Disc Re-Writeable or Write Many Read Many). With respect to DVDs, DVDs are often referred to as DVD-R and DVD-RW designating read and read-write version respectively.

As is known, the design of a read-only CD or DVD includes a circular piece of injection-molded and transparent plastic (usually polycarbonate) around 1.2 millimeters thick and having a 12 centimeter diameter. With read-only discs, the polycarbonate includes a long, tight spiral originating at the centre of the disc and having billions of tiny bumps. The bumps, when coated with an aluminum reflective layer can be read by a combined laser and opto-electric device and are interpreted as data bits. In addition to the aluminum reflective layer, the CD includes an acrylic coating of the aluminum layer and may include a label adhered to the acrylic layer. The laser is directed through the polycarbonate layer.

The recordable CD and DVD differs from the read-only media in the reflective layer and the absence of physical bumps in the polycarbonate plastic. Rather, the recordable CD or DVD includes a data layer comprising a chemical compound which may be altered to represent the light equivalent to a physical bump. WORM media utilize an organic dye which is normally reflective but when heated to a particular temperature by a laser causes a colour change, thereby optically representing a bump.

CD-RWs also use a specialized reflective layer as in the WORM media. More specifically, multiple RW technology uses a specialized compound which is an alloy of antimony, indium, silver and tellurium. This compound will undergo different phase changes when heated to different temperatures. If the compound is heated to a first lower temperature, the compound will crystallize as it cools and become reflective. If the compound is heated to a higher temperature, the compound will not crystallize as it cools and have a dull appearance. Accordingly, depending on the temperature that the media is heated to will determine whether the compound will represent a bump. Furthermore, because the chemistry does not change as result of the heating temperature, the media may be erased and re-recorded.

CD/DVD media can store upwards of 780 Mbytes of data on the conventional 12 cm disc. With such a large amount of storage capacity, it is often not required that the full available surface area be available for data storage, thereby permitting the creation of CD/DVD media having a smaller but different shape to the conventional circle. For example, discs can be shaped to a small rectangle corresponding to a business card or to almost any shape where a reasonable amount of data storage area remains on the disc.

Past techniques for shaping discs to shapes other than the standard 12 cm circle format have primarily used computer controlled shaping devices which utilize high speed rotating culling spindle to create a desired shape from a circular blank. While this technique is effective in efficiently shaping large quantities of discs, the process often damages the data storage media immediately adjacent the edge thereby affecting the visual appearance of the shaped disc as well as reducing the amount of data storage media which may lead to read and write errors with respect to any data stored thereon. This problem is particularly noted in the shaping of read-write compact discs where the data storage media is more fragile than that of a read-only CD.

With respect to recordable CD/DVD technologies, in view of the absence of physical bumps, the relative strength of adhesion of the data layer to the plastic substrate is reduced and, as a result makes shaping of the CD by conventional shaping techniques difficult. That is, traditional methods of shaping CDs results in substantial damage to the data layer beyond the immediate edge.

Accordingly, there has been a need for a system which provides an effective and efficient method of shaping discs to any desired shaped and which provides an undamaged edge on the optical discs.

More specifically, there has been a need for a method of shaping discs wherein the disc is shaped by a stamping and/or shearing process which provides a shearing pressure to the disc which results in an undamaged edge and which seals the cut edge. Still further, there has been a need for a method that enables rapid creation of shaped discs at a reasonable price.

A review of the prior art has revealed that such an apparatus or process has not been described. For example U.S. Pat. No. 5,997,788 describes a method of manufacturing CD and DVD discs in a combined molding and cutting process. U.S. Pat. No. 5,942,165 describes a process for forming irregularly shaped CDs using cutting technology. U.S. Pat. No. 5,938,989 describes a process for manufacturing optical elements from a larger disc. U.S. Pat. No. 5,882,555 discloses a method for cutting discs into non-circular shapes; U.S. Pat. No. 5,108,789 describes a method of machining discs to improve their stability utilizing a spindle; and Japanese publication 89-353059/48 describes a method of manufacturing discs which are free of burrs by using ultra violet ray curing resins.

SUMMARY OF THE INVENTION

The invention generally relates to a method for shaping optical storage discs and shaped optical storage discs prepared by the method.

In accordance with the invention, there is provided a method of shaping optical storage discs (OSD) comprising placing an OSD between a die set having a male die and female die corresponding to a desired shape and advancing and retracting the die set so as to die-cut the desired shape to form a shaped OSD.

In various embodiments of the invention, various designs of the die include features such as a central pin for alignment of the OSD on the male die and/or an elevated cutting edge on the female die In a preferred embodiment, the female die has a three dimensional cutting surface and the female die is advanced with respect to the male die from one or more first contact points defined as the point of first overlap between the male and female die and/or a system for biasing a shaped OSD against the male die as the female die is withdrawn from the male die.

In another preferred embodiment, and particularly for recordable OSDs, the method further includes the step of sealing the outer edge of the shaped OSD.

BRIEF DESCRIPTION OF THE DRAWINGS

The invention is described with reference to the following drawings in which.

DETAILED DESCRIPTION OF THE INVENTION

Overview

With reference to the FIGS., a method and apparatus for shaping optical storage discs (OSD) is herein described.

Figure 1:
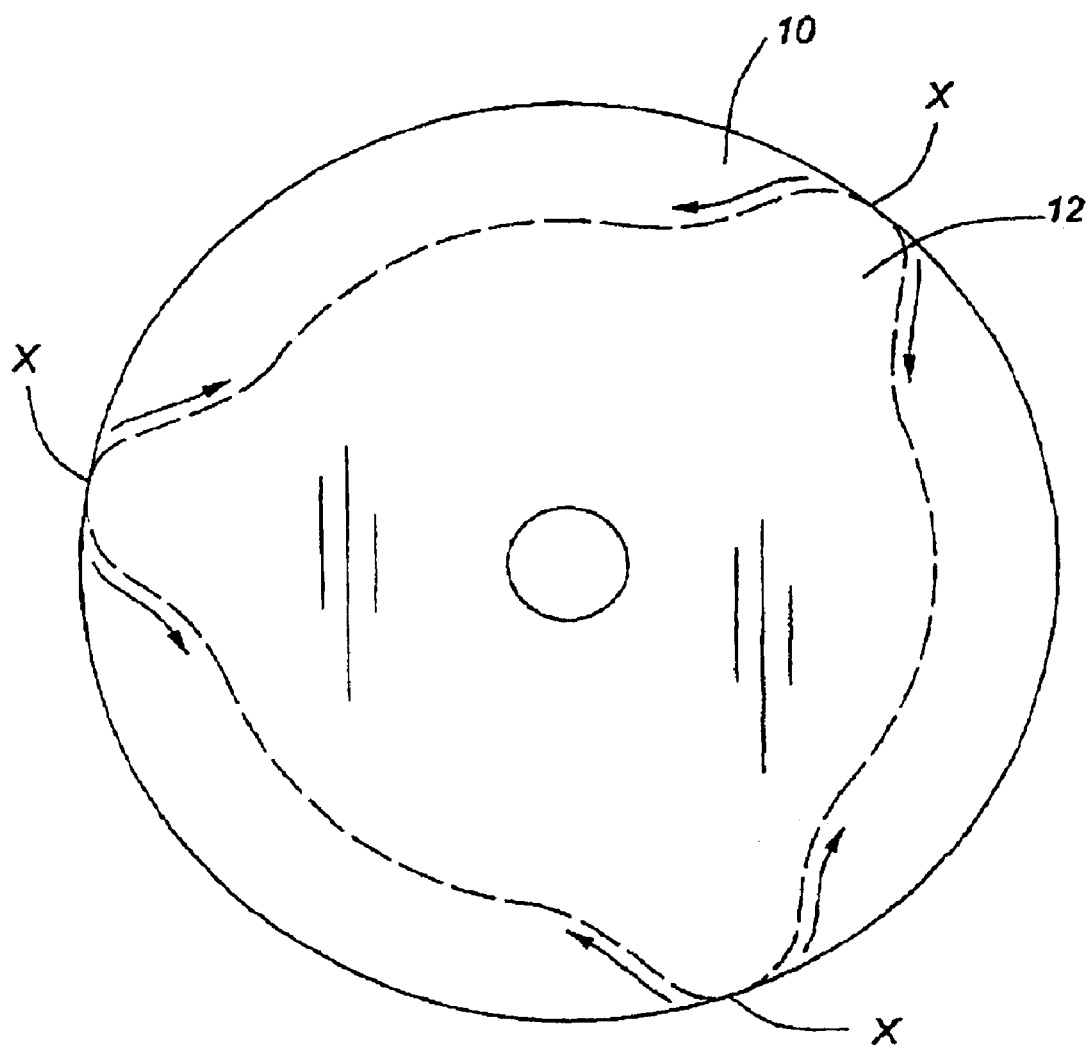
FIG. 1 is a plan view of a typical compact disc showing the outline of a shaped optical storage disc (OSD) in dotted lines.

More specifically and with reference to FIG. 1, a standard circular CD/DVD is shown, having a data layer that extends from an inner circumference adjacent the central hole of the CD/DVD, to the periphery of the CD/DVD. In accordance with the invention, a disc having a non-circular shape 12 may be produced as shown in the dotted lines.

Figure 2:
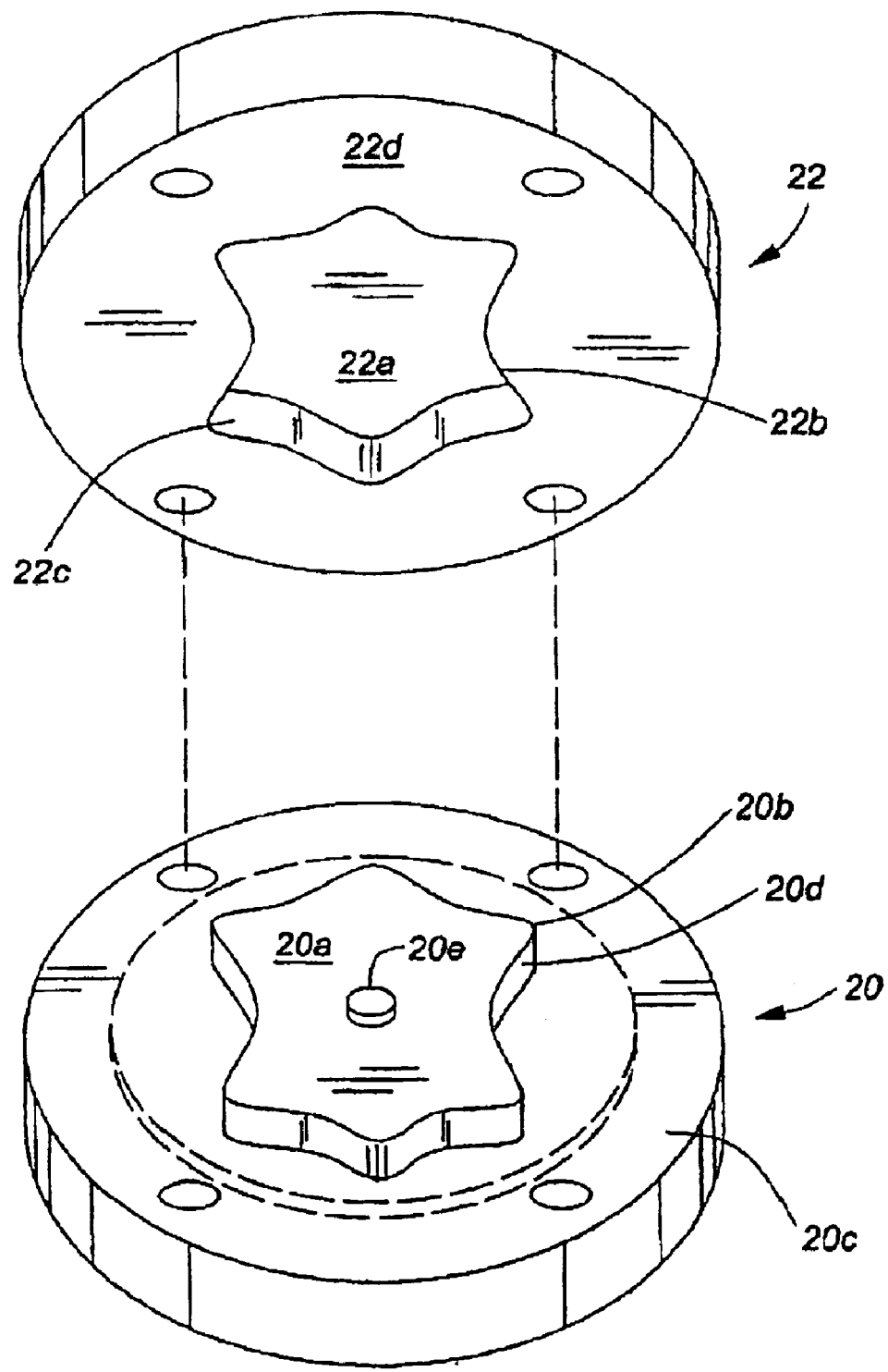
FIG. 2 is a perspective view of a die cutting system in an open view with an unstamped OSD in dotted lines shown thereon.

With reference to FIG. 2, a die set including a male portion 20 and female portion 22 is shown. The male portion has a central post 20a having an upper edge 20b corresponding to the desired optical disc shape and elevated above base 20c by walls 20d. A centering pin 20e is also preferably provided to ensure accurate alignment of the disk disc with the die set and to prevent movement of the OSD with respect to the dies during cutting. Similarly, the female portion 22 includes opening 22a having a lower edge 22b and side walls 22c which corresponds in shape to the post 20a within body 22d. The post 20a matingly engages with the opening 22a such that walls 20d and 22c slidingly engage with one another to desired engineering tolerances. The male and female portions 20 and 22 are mounted within a die press apparatus and guide pins (not shown) to align and to advance and withdraw the male and female portions with respect to one another. As shown, the base 20c an body 22d include appropriate guide pin holes for mounting guide pins to ensure precise alignment as the base 20c and body 22d are advanced and withdrawn with respect to one another. A standard press for the stamping of sheet metal or custom built presses based on an eccentric cam, hydraulic or pneumatics cylinders etc. may be employed in the shaping function.

The process of producing a stamped disc includes the steps of:
1. The male and female portions are separated with respect to one another and an OSD is placed and centered on either the male or female portion with the data side facing away from the male portion;
2. The dies are brought together so as to cut the OSD to the desired shape;
3. The dies are separated and the OSD is removed; and,
4. The edges of the shaped OSD are optionally sealed with a sealing compound.

Die Design

In accordance with the invention, the design of the male and female die set may be embodied in various forms. Ranges in tolerances, die edge characteristics and alignment angle can be used to produce shaped OSDs with an aesthetically acceptable appearance and with minimum damage to the data layer adjacent the edge as described below.

Tolerances between the male and female dies affect the quality of the edge after die cutting. Tolerances between 1 and 10 thousandths of an inch were tested. At the tighter tolerances, the smoothness of the die-cut edge improved, however, this must be balanced against the tolerances of the stamping machinery to ensure that the die set is not damage by stamping machinery misalignment.

Figure 2A:
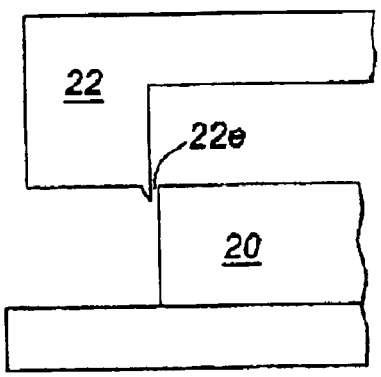
FIG. 2A is a schematic side view of a die cutting system showing details of a cutting edge in accordance with one embodiment of the invention.

As shown in FIG. 2A, die edge characteristics can also affect edge quality. The edge 20b of post 20a or the edge 22b of the body 22d may be provided with an elevated edge 22e. In production, the elevated edge 22e provided a smoother die-cut edge during die-cutting but was also subject to dulling after repeated use which decreased the quality of the product.

With respect to alignment angle, that is the relative orientation of the plane of base 20c with respect to the plane of body 22d, out of plane orientations will cause one side of the disc to be cut prior to the opposite side of the disc being cut by the advancing dies. Accordingly, out-of-plane orientations will cause a shearing force to advance around the OSD as the dies come together to cut the OSD. This die design also produced a smooth edge. However, it should be noted that by sloping the male die, some difficulties were observed with respect to maintaining the central alignment of the OSD. However, sloping the cutting edge of the female die produced a smooth edge.

Figure 2B:
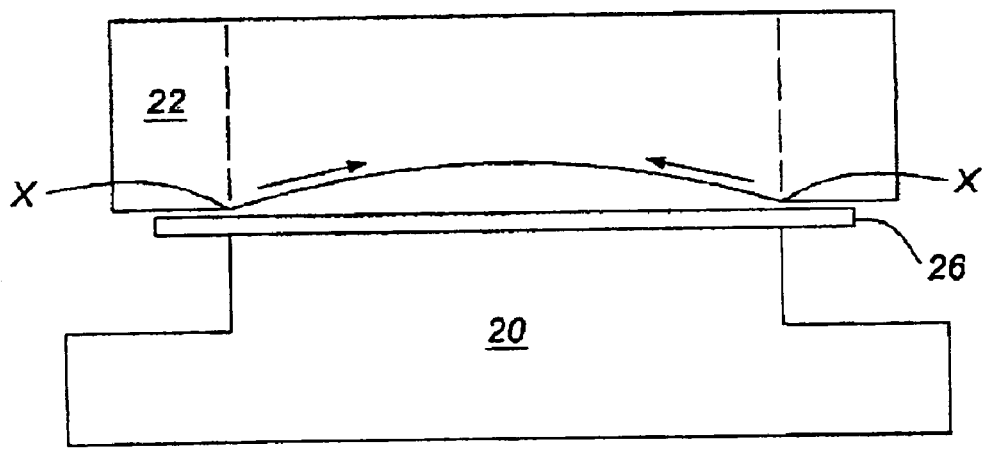
FIG. 2C is a schematic side view of a die cutting system showing details of the position of the male and female dies during removal of a cut disk in accordance with one embodiment of the invention.
FIG. 2D is a schematic side view of a die cutting system showing details of a female die having an inner plate biased against the upper surface of the male die in accordance with one embodiment of the invention

Still further, a die design in which the female die has a three-dimensional profile is also effective. In this design, one or more specific locations of the female die will contact the upper surface of the OSD before other areas as shown in FIGS. 1 and 2B. Specifically, the female die may be dished or sloped to create one or more first contact points from which cutting of the OSD advances from. As shown in FIG. 2B, two contact points X are shown wherein the female die 22 first contacts the upper edge of an OSD at positions X and wherein shearing of the OSD progresses in the direction of the arrows. Similarly, FIG. 1 (at positions X) shows schematically how an OSD may be sheared from three first contact points in the direction of the arrows. This design of die is particularly effective for creating non-circular OSD designs where a region of the desired shape has a radius greater than another region. By creating a die set in which the shearing forces originate at the outermost radius edges of the OSD and progress towards the center, a centering force on the OSD is provided which reduces misalignment errors of the OSD product.

Die-Cutting Process

The process of cutting an OSD involves parameters which must be controlled to ensure minimal damage to the data layer and to produce an aesthetically acceptable edge. These parameters include processing speed and the product removal process.

With respect to recordable OSDs, the risk of damage to the data layer is greater than with read-only OSDs where an improperly controlled die-cutting process may shatter the data layer or cause it to lift away from the plastic layer. Various methodologies may be employed to eliminate damage to the data-layer.

Figure 2C:
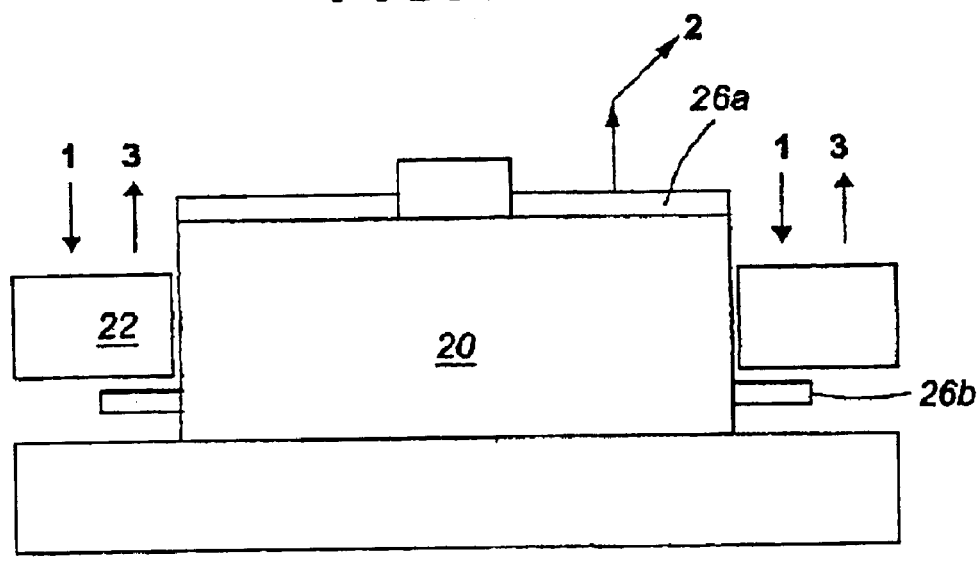

A preferred methodology involves the design of a female die with an open top which allows the die-cut OSD to be removed prior to the separation of the dies as shown in FIG. 2C. In this methodology, the female die 22 extends over the male die 20 (step 1) allowing the cut disk 26a to be removed (step 2) prior to the retraction of the female die 22 (step 3). The removal of the cut disk 26a before retraction prevents any upward pressure on the edge of the data layer. The cut portion 26b is removed after the female die 22 has been retracted. In order to allow for the cut disk 26a to be removed, it may require that female die 22 be paused during the cycle to allow removal machinery (not shown) to remove the cut disk 26a.

Figure 2D:
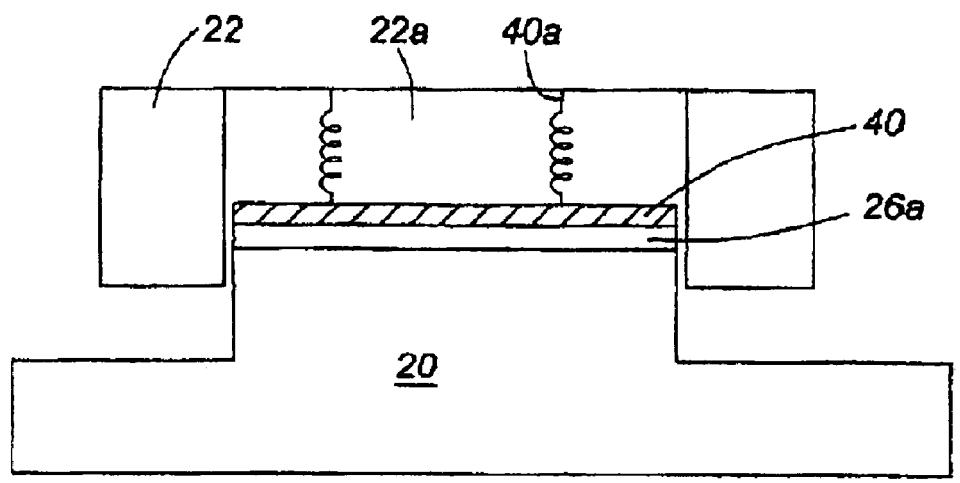

In another embodiment, the female cavity 22a may be filled with a resilient foam compound that is compressed as the female die 22 is advanced over the male die and which will bias the shaped disk against the upper surface of the male die 20 as the female die is retracted. This has the effect and benefit of ensuring that the shaped disk does not withdraw with the female die and that the data layer is covered during die-cutting. As an alternative to a resilient foam, the female die may be fitted with an inner plate 40 (the underside of which may be coated with a data layer protecting compound) which is biased against the upper surface of the male die by springs 40a as shown in FIG. 2D.

With respect to the processing speed, the speed at which the male portion of the die contacts the disk and the speed with which the die passes through the disk are both important. Generally, it is important that the contact speed is not too high which may result in the disk shattering when contacted. Similarly, if the travel speed of the male die through the female die is too great, the quality of the finished edge may be compromised. Accordingly, a compromise must be reached between maintaining a high production speed while maintaining a good quality edge. Cycle times of around 1 cycle per second have been achieved to produce a die-cut disk with a good quality edge.

The alignment of the OSD in the die set is also important as indicated above. This is of greater importance in the die cutting process for a recordable OSD that will be recorded upon after shaping as compared to a read-only OSD. More specifically, as a result of the typical error checking algorithms in reading from a read-only OSD, misalignment errors can be tolerated to a greater extent. However, in a recordable OSD, the same algorithms are not used during the recording process with the result that any induced vibrational errors from an imbalanced OSD may result in a higher level of write errors.

Preferably, the OSD is held with a center pin 20e as described above. Alternatively, the OSD may be held at its perimeter. However, using this method less alignment accuracy was observed.

Sealing Process

After cutting the disc to the desired shape, it is preferred to seal the edge of the shaped OSD, particularly for discs with recordable data layers. That is, when a previously manufactured OSD is subjected to the die-cutting process, the previously existing protection along the edge is removed along the cut edge, which should be sealed to prevent damage during handling and/or separation of the data layer from the plastic. Almost any sealing compound appropriate for use with polycarbonate plastics can be used including lacquers and paints. A preferred compound is LOCTITE 3751 (modified acrylic ester) which is preferably applied by a specific LOCTITE applicator and cured by exposure to low-level ultraviolet light. This particular sealing methodology is preferred for volume production.

Sealing compounds may be applied by other techniques including brush, roller, or spray applicators as appropriate for the specific compound or the desired appearance of the final product.

Other sealing methodologies may include a combined application of a sealing compound in conjunction with a label printing process.

Figure 3A:
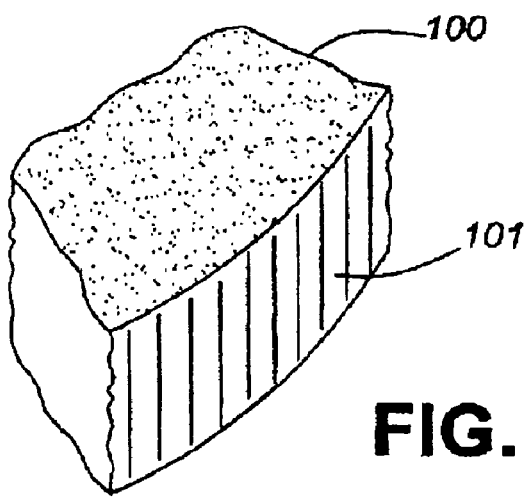
FIG. 3A is a sketch of the edge of a stamped OSD in accordance with the invention showing an undamaged data layer and vertical scratches on the disc-edge.
Figure 3B:
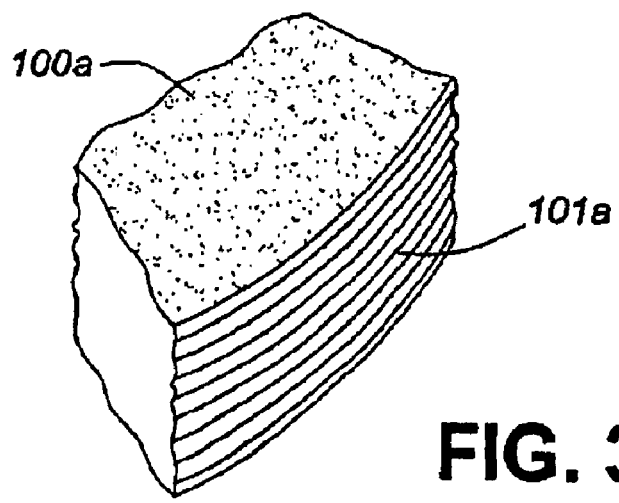

Representative sketches are shown of a die-cut OSD in accordance with the invention (FIG. 3A) in comparison to a router-cut OSD prepared in accordance with the prior art (FIG. 3B). As shown in FIG. 3A, the data layer 100 is undamaged whereas in FIG. 3B, the data-layer 100a is illustrated as being damaged most typically by peeling-back of the data layer from the edge. In addition, FIG. 3a shows vertical scratches 101 on the edge whereas FIG. 3B shows horizontal scratches.

I claim:

1. A method of shaping a recordable optical storage disc (OSD), comprising: placing a recordable OSD between a die set having a male die and a female die, the die set corresponding to a desired shape; and advancing the die set so as to die-cut the recordable OSD and a recordable data layer of the recordable OSD to impart the desired shape to the recordable OSD thereby forming a shaped recordable OSD with minimal damage to the recordable data layer.

2. A method as in claim 1 wherein the male die includes a central pin for alignment of the recordable OSD on the male die.

3. A method as in claim 1 wherein the female die includes an elevated cutting edge.

4. A method as in claim 1 wherein the tolerance between the male and female die is between 1 and 10 thousandths of an inch.

5. A method as in claim 1 wherein the male and female die are advanced in an out-of-plane orientation such that the male and female die engage from one side to an opposite side with respect to each other.

6. A method as in claim 1 wherein the female die has a three dimensional cutting surface and wherein the female die is advanced with respect to the male die from one or more first contact points defined as the point of first overlap between the male and female die.

7. A method as in claim 6 wherein the one or more first contact points are at the greatest radial position of the desired shape.

8. A method as in claim 1 wherein the female die has a thickness enabling a shaped recordable OSD to be removed from the upper surface of the male die when the female die is fully advanced over the male die.

9. A method as in claim 1 further comprising the step of retracting the female die from the male die while biasing the shaped recordable OSD against the male die.

10. A method as in claim 1 wherein the cycle time is 1 cycle per second.

11. A method as in claim 1 further comprising the step of sealing the outer edge of the shaped OSD with a sealing compound.

12. A method as in claim 11 wherein the sealing compound is selected from any one of or a combination of a paint, lacquer or an ultraviolet light curing acrylic ester.

13. A method as in claim 11 wherein the sealing compound is applied by brushing, spraying, rolling, or hollow tube application.

14. A method of shaping recordable optical storage discs (OSD), comprising the steps of: a) placing a recordable OSD between a die set having a male and female die corresponding to a desired shape; b) advancing the die set so as to die-cut the recordable OSD and a recordable data layer of the recordable OSD to impart the desired shape to the recordable OSD, thereby forming a shaped recordable OSD with minimal damage to the recordable data layer; c) removing the shaped recordable OSD from the die set; and d) retracting the die set.

* * * * *

UNITED STATES PATENT AND TRADEMARK OFFICE
CERTIFICATE OF CORRECTION

PATENT NO. : 6,939,485 B2
DATED : September 6, 2005
INVENTOR(S) : Randy Kish

It is certified that error appears in the above-identified patent and that said Letters Patent is hereby corrected as shown below:

Column 2,
Line 13, between "utilize" and "high", insert -- a --.
Line 14, replace "culling" with -- cutting --.

Column 3,
Line 32, replace "disk" with -- disc --.
Line 41, add -- FIG. 3B is a sketch of the edge of a OSD prepared by a router in accordance with the prior art showing damage to the data layer and horizontal scratches on the disc-edge. --.
Line 58, replace "disk" with -- disc --.

Column 4,
Line 2, replace "an" with -- and --.

Signed and Sealed this

Twentieth Day of December, 2005

JON W. DUDAS
*Director of the United States Patent and Trademark Office*